United States Patent Office 3,036,096
Patented May 22, 1962

3,036,096
3-ENOL ETHERS OF 6-BROMO PROGESTERONES
Howard J. Ringold, Octavio Mancera, George Rosenkranz, and John Edwards, Mexico City, Mexico, assignors to Syntex S.A., Mexico City, Mexico, a corporation of Mexico
No Drawing. Original application Feb. 13, 1959, Ser. No. 792,990. Divided and this application Mar. 1, 1961, Ser. No. 106,139
Claims priority, application Mexico Feb. 14, 1958
9 Claims. (Cl. 260—397.4)

The present invention relates to cyclopentanophenanthrene compounds and to a novel process for the production thereof.

More particularly the present invention refers to novel 6α-bromo progesterone, 6α-bromo-17α-hydroxy-progesterone and esters thereof of hydrocarbon carboxylic acids of less than 12 carbon atoms, the corresponding $\Delta^1$-dehydro compounds and 21-fluoro derivatives, and to 6α-bromo-17α-lower alkyl, lower alkenyl and lower alkinyl derivatives of testosterone, 19-nor-testosterone and esters thereof of a hydrocarbon carboxylic acid of less than 12 carbon atoms.

The 6-bromo compounds as above set forth exhibit progestational activity and as such are useful therapeutic agents. The present invention also relates to 3-lower alkyl enol ethers of the above set forth 6α-bromo-$\Delta^4$-derivatives; these compounds are likewise useful therapeutic agents having progestational activity of long duration. Further the present invention relates to a novel process for producing compounds of this type and especially of the androstene and pregnene series.

In accordance with the present invention we discovered that treatment of 3-lower alkoxy-$\Delta^{3,5}$-pregnadien and androstadien derivatives with hypobromous acid, or an agent capable of liberating this acid produces 6β-bromo-$\Delta^4$-pregnene and androstene compounds which upon treatment with an acid under conditions as below set forth give the novel 6α-bromo compounds of the present invention. Treatment of the last compounds with selenium dioxide in the known manner produces the $\Delta^{1,4}$-diones. Alternatively, treatment of the novel 6α-bromo-$\Delta^4$-compounds, or the 6β-bromo intermediates with a lower alkyl orthoformate, such as for example methyl, ethyl, and butyl orthoformate furnishes the 3-lower alkoxy-6-bromo-$\Delta^{3,5}$-pregnadien derivatives.

The novel compounds of the present invention are illustrated by the following formulas:

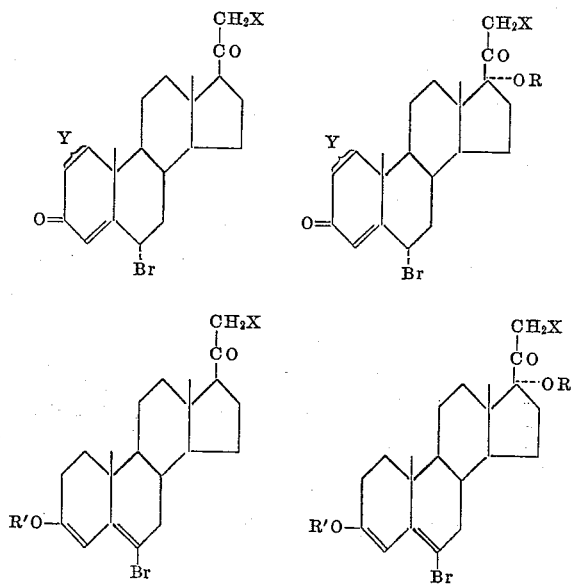

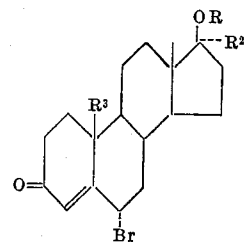

In the above formulas Y represents an additional double bond between C-1 and C-2 or a saturated linkage, X represents hydrogen or fluorine atom, $R^1$ represents a lower alkyl group of less than 6 carbon atoms such as for example methyl, ethyl, butyl or pentyl and R represents a hydrogen or an acyl group derived from hydrocarbon carboxylic acid of less than 12 carbon atoms, saturated or unsaturated straight chain or branched chain aliphatic, cyclic or cyclic-aliphatic, which can be further substituted as for example with chlorine or methoxy. Typical examples of such an acyl group are acetate, propionate, enanthate, trimethylacetate, hemisuccinate, cyclopentylpropionate, benzoate, phenoxypropionate and β-chloropropionate. $R^3$ is selected from the group consisting of hydrogen and methyl and $R^2$ is selected from the group consisting of lower alkyl, lower alkenyl and lower alkinyl.

The process for preparing the novel compounds of the present invention is illustrated in the below set equation. In this equation $R^1$ represents the same group as above set forth.

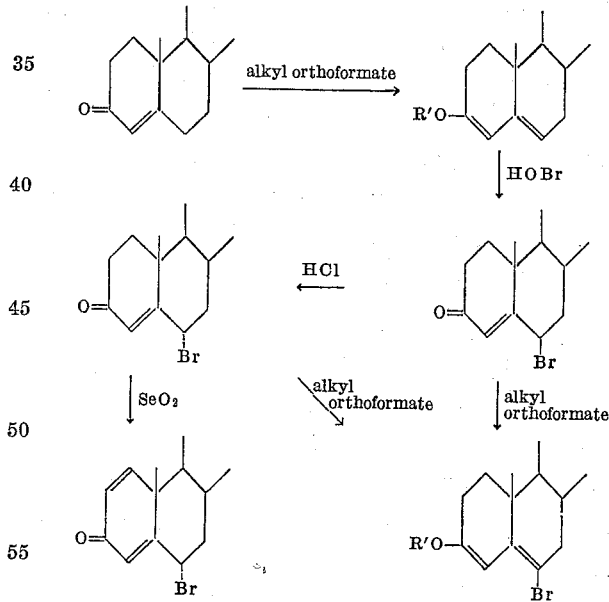

In practicing the process as above set forth treatment of $\Delta^4$-3-keto-pregnene or androstene derivatives as above set forth dissolved in an organic solvent as for example dioxane, with a lower alkyl orthoformate and an acid catalyst such as for example p-toluenesulfonic acid at room temperature for several hours, followed by isolation and purification gave 3-alkoxy-$\Delta^{3,5}$-pregnadiene and androstadiene derivatives. Treatment of the last compound with hypobromous acid, or an agent capable of liberating this acid such as N-bromo amide or imide, gave directly the corresponding 6β-bromo-$\Delta^4$-3-keto pregnene and androstene compounds which were isolated and purified. Preferably the treatment was carried out with N-bromo succinimide using aqueous acetone as solvent and in presence of acetic acid and sodium acetate for several hours at temperatures around 0° C. The resulting 6β-bromo-Δ⁴-3-keto pregnene and androstene derivatives, dissolved in a lower alkyl organic acid, preferably acetic acid, with strong mineral acid, such as for example hydrogen chloride for several hours at temperatures between 5 to 25° C., furnished the novel 6α-bromo-Δ⁴-3-keto pregnene and androstene compounds. The introduction of an additional double bond between C–1 and C–2 was preferably accomplished by selenium dioxide oxidation in t-butanol by known methods.

The 6-bromo-3-alkoxy-Δ$^{3,5}$-pregnadien compounds were prepared by reacting the 6β- or 6α-bromo-Δ⁴-3-keto derivatives with a lower alkyl orthoformate under the conditions as above set forth.

It may be noted that the process of the present invention may be applied to pregnene and androstene compounds having a free or esterified hydroxyl group as above set forth and the final compounds may be conventionally saponified and the free compounds reesterified in a conventional way.

The following specific examples serve to illustrate but are not intended to limit the present invention.

Example I

A mixture of 4 g. of 3-ethoxy-Δ$^{3,5}$-pregnadien-20-one (conventionally prepared from progesterone and ethyl orthoformate), 2.1 g. of anhydrous sodium acetate and 120 cc. of acetone was cooled to 0° C., mixed with 3.7 g. of N-bromosuccinimide and then immediately with 2 cc. of acetic acid and the mixture was stirred for 3 hours at a temperature between 0 and 5° C. Ice water was added and the mixture was kept overnight at a temperature around 0° C. The precipitate was then collected by filtration, washed with water, air dried and recrystallized from ether-acetone in the presence of a few drops of pyridine. There was thus obtained 6β-bromo-progesterone.

3 g. of the above compound was mixed with 120 cc. of glacial acetic acid, treated with 3 cc. of concentrated hydrochloric acid and kept for 2 hours at room temperature. The mixture was then poured into water and the precipitate was filtered, washed with water, air dried and recrystallized from methylene dichloride-ether. There was thus obtained 6α-bromo-progesterone.

Example II 4 g. of 3-ethoxy-17α-acetoxy-Δ$^{3,5}$-pregnadien-20-one (prepared conventionally from 17α-acetoxy-progesterone) was treated with N-bromosuccinimide to produce 6β-bromo-17α-hydroxy-progesterone 17-acetate and then the steric configuration at C–6 of the latter was inverted, in accordance with the method described in the previous example. There was thus obtained 6α-bromo-17α-hydroxy-progesterone 17-acetate.

Example III

In another experiment, in accordance with the methods of the previous examples, the reaction with N-bromosuccinimide was substituted for a reaction with N-bromoacetamide, which was carried out under same conditions. There were thus obtained 6β-bromo-progesterone and 6β-bromo-17α-hydroxy-progesterone 17-acetate. They were then treated with dry hydrogen chloride in glacial acetic acid solution for 70 minutes at temperatures around 15° C., and the products were isolated in the same way as described for the reaction with aqueous concentrated hydrochloric acid in Example I. The 6α-bromo-progesterone and 6α-bromo-17α-hydroxy-progesterone 17-acetate thus obtained were identical with compounds described above.

Example IV

In other experiments, instead of 3-ethoxy-17α-hydroxy-Δ$^{3,5}$-pregnadien-20-one there was used as starting material 3-propoxy-17α-propionoxy-Δ$^{3,5}$-pregnadien-20-one; following the procedures described in the previous examples there was finally obtained, via the propionate of 6β-bromo-17α-hydroxy-progesterone, the 17-propionate of 6α-bromo-17α-hydroxy-progesterone.

Example V

A mixture of 4 g. of 21-fluoro-17α-acetoxy-progesterone, 28 cc. of anhydrous dioxane and 120 mg. of p-toluenesulfonic acid monohydrate was stirred for 30 minutes and then mixed under stirring and cooling with 10 cc. of pyridine and 400 cc. of water; the reaction product was extracted with ether and the extract was washed with water, dried over anhydrous sodium sulfate and evaporated to dryness. The residue crystallized from methanol-water to furnish 21-fluoro-17α-acetoxy-3-ethoxy-Δ$^{3,5}$-pregnadien-20-one.

3 g. of the above compound was dissolved in 90 cc. of acetone, cooled to 0° C. and treated with 1.6 g. of anhydrous sodium acetate and 3 g. of N-bromosuccinimide and finally with 1.5 cc. of glacial acetic acid; the mixture was stirred at a temperature of 0–5° C. for 3 hours, mixed with 500 cc. of ice water and kept overnight at 0° C.; the precipitate was filtered, washed with water, dried and recrystallized from a mixture of ether and acetone containing a few drops of pyridine. There was thus obtained 6β-bromo-21-fluoro-17α-acetoxy-progesterone, which was converted into the 6α-isomer through an adequate acid treatment, such as the reaction with dry hydrogen chloride in glacial acetic acid solution.

Example VI

In the method of Example V, the acetate group of C–17 of the starting compound was substituted by another ester; thus, the 17-caproate of 21-fluoro-17α-hydroxy-progesterone was treated with ethyl orthoformate to produce 21-fluoro-17α-capronoxy-3-ethoxy-Δ$^{3,5}$-pregnadien-20-one and the latter was converted, by reaction with N-bromosuccinimide, into 6β-bromo-21-fluoro-17α-capronoxy-progesterone, whose steric configuration at C–6 was inverted by the treatment with dry hydrogen chloride in glacial acetic acid; the 17-cyclopentylpropionate of 21-fluoro-17α-hydroxy-progesterone was converted by reaction with the tripropyl ester of orthoformic acid into 21-fluoro-17α-cyclopentylpropionoxy-3-propoxy-Δ$^{3,5}$-pregnadien-20-one, which was treated with N-bromosuccinimide and then with dry hydrogen chloride to give 6β-bromo-21-fluoro-17α-cyclopentylpropionoxy-progesterone and then 6α-bromo-21-fluoro-17α-cyclopentylpropionoxy-progesterone.

Example VII

A mixture of 2 g. of 6α-bromo-progesterone, 100 cc. of anhydrous t-butanol, 0.8 g. of selenium dioxide and 0.5 cc. of pyridine was refluxed under an atmosphere of nitrogen for 18 hours. The mixture was filtered through celite, washing the filter with hot t-butanol, and the combined filtrate and washings was evaporated to dryness under reduced pressure. The residue was dissolved in acetone, treated with decolorizing charcoal, refluxed for 1 hour and filtered through celite. The acetone solution was evaporated to dryness and the residue purified by chromatography on neutral alumina, thus furnishing 6α-bromo-Δ$^{1,4}$-pregnadien-3,20-dione.

Example VIII

Following the procedure described in the previous example there were prepared from the corresponding 6α-bromo-Δ⁴-3-keto compounds several 6α-bromo-Δ$^{1,4}$-dienes, more specifically: the 17-acetate and caproate of 17α - hydroxy - 6 - bromo - Δ$^{1,4}$ - pregnadien - 20 - one; 21 - fluoro - 6 - bromo - Δ$^{1,4}$ - pregnadien - 20 - one; 21 - fluoro - 6 - bromo - Δ$^{1,4}$ - pregnadien - 17α - ol - 20 - one; 17-acetate of 21-fluoro-6-bromo-Δ$^{1,4}$-pregnadien-17α-ol-one.

Example IX

To a solution of 5 g. of 6α-bromo-progesterone in 25 cc. of anhydrous dioxane there was added 5 cc. of ethyl orthoformate and 0.8 cc. of a solution of p-toluene-sulfonic acid prepared by dissolving 500 mg. of acid in a mixture of 5.4 cc. of dioxane and 1.1 cc. of absolute ethanol. The mixture was allowed to react at room temperature for 1 hour and then the solvent was evaporated to dryness under reduced pressure; crystallization of the residue from methanol yielded 6-bromo-3-ethoxy-$\Delta^{3,5}$-pregnadien-20-one.

Example X

Substituting in the method of the previous example the ethyl orthoformate for the tripropylate of orthoformic acid there was obtained 6-bromo-3-propoxy-$\Delta^{3,5}$-pregnadien-20-one.

Example XI

By the same method as described in Example IX there were prepared the 6-bromo-21-fluoro-3-ethoxy-$\Delta^{3,5}$-pregnadien-20-one, the 17-acetate of 6-bromo-3-ethoxy-$\Delta^{3,5}$-pregnadien-17$\beta$-ol-20-one and the 17-acetate of 6-bromo-3-propoxy-$\Delta^{3,5}$-pregnadien-17$\beta$-ol-20-one.

Example XII

A mixture of 4 g. of 17$\alpha$-methyl-3-ethoxy-$\Delta^{3,5}$-androstadien-17$\beta$-ol, 2.5 g. of anhydrous sodium acetate and 120 cc. of acetone was cooled to 0° C. and treated with 4 g. of N-bromosuccinimide followed by 2.3 cc. of glacial acetic acid. The mixture was stirred for 3 hours at 0.5° C., then ice water was added and the mixture was kept overnight in the refrigerator. The precipitate was collected by filtration, washed with water, air dried and recrystallized from ether-acetone in the presence of a few drops of pyridine. There was thus obtained 17$\alpha$-methyl-6$\beta$-bromo-testosterone.

A mixture of 3 g. of the above compound and 120 cc. of acetic acid was treated with 3 cc. of aqueous concentrated hydrochloric acid and the mixture was kept standing at room temperature for 20 minutes. After diluting with water the precipitate was collected, washed with water, dried under vacuum and recrystallized from a mixture of methylene chloride and ether. There was thus obtained 17$\alpha$-methyl-6$\alpha$-bromo-testosterone.

Example XIII

By following the method of the previous example, 17$\alpha$ - propyl - 3 - ethoxy - 19 - nor - $\Delta^{3,5}$ - androstadien-17$\beta$-ol 17-acetate was converted into 17$\alpha$-propyl-6$\alpha$-bromo-19-nor-testosterone 17-acetate, via the intermediate 17$\alpha$-propyl-6$\beta$-bromo-19-nortestosterone 17-acetate.

Example XIV

By applying the method of Example XII to 17$\alpha$-ethinyl-3-propoxy-$\Delta^{3,5}$-androstadien-17$\beta$-ol 17-propionate there was obtained 17$\alpha$-ethinyl-6$\alpha$-bromo-testosterone 17-propionate, via the intermediate 17$\alpha$-ethinyl-6$\beta$-bromo-testosterone 17-propionate.

Example XV

By following the procedure described in Example XII, and starting from a 3-alkyl-enol-ether of the 17$\alpha$-substituted testosterones, 19-nor-testosterones and their 17-esters, there were obtained, via the respective 6$\beta$-bromo-testosterones free or esterified at C-17$\beta$, other 17$\alpha$-substituted testosterones of the 10-methyl and the 19-nor series comprised in our invention, as well as their respective 17-esters. In this way there were obtained 17$\alpha$-methyl, ethyl, ethinyl, propinyl and butinyl derivatives of 6$\alpha$-bromo-19-nor-testosterone and of 6$\alpha$-bromo-testosterone as well as propionates, cyclopentylpropionates and benzoates thereof.

Example XVI

In other experiments the reaction with N-bromosuccinimide was substituted by a reaction with sodium hypobromite; the inversion of the steric configuration at C-6 of the 6$\beta$-bromo compounds was also achieved by treatment of a solution of the steroid in glacial acetic acid with dry halogen chloride at temperatures around 15° C., or alternatively by treatment of a chloroform solution of the steroid with a saturated solution of dry hydrogen chloride in chloroform.

This application is a division of our copending application Serial No. 792,990, filed February 13, 1959.

We claim:

1. A compound of the following formula:

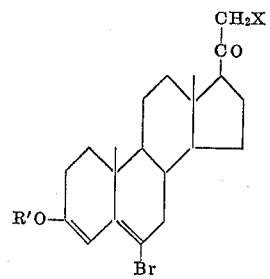

wherein X is selected from the group consisting of hydrogen and fluorine and R$^1$ is an alkyl group of less than 6 carbon atoms.

2. 6-bromo-3-ethoxy-$\Delta^{3,5}$-pregnadien-20-one.
3. 6-bromo-21-fluoro-3-ethoxy-$\Delta^{3,5}$-pregnadien-20-one.
4. A compound of the following formula:

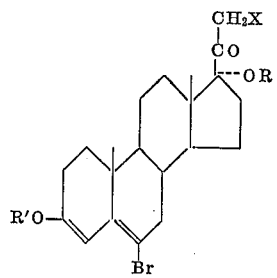

wherein X is selected from the group consisting of hydrogen and fluorine, R$^1$ is an alkyl group of less than 6 carbon atoms and R is selected from the group consisting of hydrogen and hydrocarbon carboxylic acyl group of less than 12 carbon atoms.

5. 6-bromo-3-ethoxy-$\Delta^{3,5}$-pregnadien-17$\alpha$-ol-20-one.
6. The 17-acetate of 6-bromo-3-ethoxy-$\Delta^{3,5}$-pregnadien-17$\alpha$-ol-20-one.
7. The hydrocarbon carboxylic ester of less than 12 carbon atoms of 6-bromo-3-ethoxy-$\Delta^{3,5}$-pregnadien-17$\alpha$-ol-20-one.
8. 6 - bromo - 21 - fluoro - 3 - ethoxy - $\Delta^{3,5}$ - pregnadien-17$\alpha$-ol-20-one.
9. The hydrocarbon carboxylic ester of less than 12 carbon atoms of 6-bromo-21-fluoro-3-ethoxy-$\Delta^{3,5}$-pregnadien-17$\alpha$-ol-20-one.

References Cited in the file of this patent

UNITED STATES PATENTS

| | | |
|---|---|---|
| 2,332,815 | Ruzicka | Oct. 26, 1943 |
| 2,835,667 | Ercoli et al. | May 20, 1958 |